(12) United States Patent
Gardner et al.

(10) Patent No.: US 8,839,550 B2
(45) Date of Patent: Sep. 23, 2014

(54) RODENT STATION

(75) Inventors: Douglas B. Gardner, Maplewood, MN (US); Jay R. Anderson, Zumbrota, MN (US); Christopher C. Wagner, St. Paul, MN (US)

(73) Assignee: Ecolab USA Inc., St. Paul, MN (US)

( * ) Notice: Subject to any disclaimer, the term of this patent is extended or adjusted under 35 U.S.C. 154(b) by 811 days.

(21) Appl. No.: 12/986,769

(22) Filed: Jan. 7, 2011

(65) Prior Publication Data
US 2012/0174469 A1    Jul. 12, 2012

(51) Int. Cl.
*A01M 23/00* (2006.01)
*A01M 23/08* (2006.01)
*A01M 23/16* (2006.01)

(52) U.S. Cl.
CPC .............. *A01M 23/00* (2013.01); *A01M 23/08* (2013.01); *A01M 23/16* (2013.01); *A01M 23/005* (2013.01)
USPC .................................................. 43/61; 43/60

(58) Field of Classification Search
CPC ..... A01M 23/30; A01M 23/04; A01M 23/18; A01M 23/20; A01M 23/22
USPC .......... 43/64–67, 69–75, 77, 81, 81.5, 82–83, 43/83.5
See application file for complete search history.

(56) References Cited

U.S. PATENT DOCUMENTS

| | | |
|---|---|---|
| 4,310,984 A | 1/1982 | Brubaker, Jr. |
| 5,082,137 A | 1/1992 | Weinstein |
| 5,094,027 A | 3/1992 | Smotherman |
| 5,109,626 A | 5/1992 | Ha |
| 5,115,595 A | 5/1992 | Garcia |
| 5,175,957 A | 1/1993 | West |
| 5,185,953 A | 2/1993 | Gross |
| 5,235,779 A | 8/1993 | Saleman |
| 5,245,784 A | 9/1993 | Oscarsson |
| 5,267,411 A | 12/1993 | Phillips et al. |
| 5,299,380 A | 4/1994 | Fornal, Sr. |
| 5,329,724 A | 7/1994 | Saleman |
| 5,337,512 A | 8/1994 | Krenzler |
| 5,345,710 A | 9/1994 | Bitz |
| 5,369,907 A | 12/1994 | Lee |
| 5,386,663 A | 2/1995 | Fields |
| 5,406,741 A | 4/1995 | Little et al. |

(Continued)

FOREIGN PATENT DOCUMENTS

| | | |
|---|---|---|
| EP | 1149530 A2 | 10/2001 |
| EP | 1149530 A3 | 4/2004 |

(Continued)

OTHER PUBLICATIONS

International Search Report and Written Opinion for corresponding international application No. PCT/IB2012/050064, dated Sep. 25, 2012, 8 pp.

*Primary Examiner* — David Parsley
*Assistant Examiner* — Timothy Schwarz
(74) *Attorney, Agent, or Firm* — Shumaker & Sieffert, P.A.

(57) ABSTRACT

A rodent station for capturing or trapping mice, rats or other rodents may provide one or more rodent entry points and is sized to receive one or more rodent suppression devices, such as conventional snap traps, ramp traps, glue boards, etc. The rodent station may present a high contrast entrance that is relatively darker than the station enclosure. The station opening size may be adjustable to accommodate both mice and/or rats. An interior receptacle for station maintenance records or other printed material may also be included.

11 Claims, 9 Drawing Sheets

(56) References Cited

U.S. PATENT DOCUMENTS

| | | |
|---|---|---|
| 5,511,339 A | 4/1996 | Pencheon |
| 5,528,852 A | 6/1996 | Sarff |
| 5,588,249 A | 12/1996 | Flinner |
| 5,673,509 A | 10/1997 | Gatewood, Jr. |
| 5,720,125 A | 2/1998 | Oviatt |
| 5,782,034 A | 7/1998 | Robin et al. |
| 5,806,237 A | 9/1998 | Nelson et al. |
| 5,809,688 A | 9/1998 | Wallen |
| 5,996,274 A | 12/1999 | Smith et al. |
| 6,016,623 A | 1/2000 | Celestine |
| 6,029,393 A | 2/2000 | Stewart |
| 6,050,024 A | 4/2000 | Manno |
| 6,125,576 A | 10/2000 | Knuppel |
| 6,164,010 A | 12/2000 | Snell et al. |
| 6,212,819 B1 | 4/2001 | Edwards |
| 6,263,612 B1 | 7/2001 | Shultz |
| 6,266,917 B1 | 7/2001 | Hight |
| D459,428 S | 6/2002 | Johnson et al. |
| 6,397,517 B1 | 6/2002 | Leyerle et al. |
| 6,481,151 B1 | 11/2002 | Johnson et al. |
| 6,493,988 B1 | 12/2002 | Johnson |
| 6,508,031 B1 | 1/2003 | Johnson et al. |
| 6,557,295 B1 | 5/2003 | Alonso |
| 6,564,501 B1 | 5/2003 | Schislyonok |
| 6,574,912 B1 | 6/2003 | Johnson |
| 6,609,328 B2 | 8/2003 | Swift et al. |
| 6,622,422 B2 | 9/2003 | Gehret et al. |
| 6,631,582 B2 | 10/2003 | Knuppel et al. |
| 6,671,998 B1 | 1/2004 | Lawrence, Sr. |
| 6,691,452 B1 | 2/2004 | Knuppel et al. |
| 6,694,669 B2 | 2/2004 | Gehret et al. |
| 6,725,597 B2 | 4/2004 | Nelson et al. |
| 6,739,086 B1 | 5/2004 | Lamb |
| 6,758,088 B2 | 7/2004 | Claussen et al. |
| 6,865,843 B1 | 3/2005 | Jordan, Sr. |
| D503,963 S | 4/2005 | Moore, Jr. |
| 6,877,270 B2 | 4/2005 | Nelson et al. |
| 6,938,368 B2 | 9/2005 | Guidry |
| 6,955,007 B2 | 10/2005 | Gehret et al. |
| 6,990,766 B2 | 1/2006 | Gehret et al. |
| 6,990,767 B1 | 1/2006 | Margalit |
| D518,138 S | 3/2006 | Burke |
| 7,069,688 B2 | 7/2006 | Hill |
| 7,162,832 B2 | 1/2007 | Simpson et al. |
| 7,216,457 B1 | 5/2007 | Hanning, Jr. |
| 7,363,744 B2 | 4/2008 | Kness et al. |
| D573,770 S | 7/2008 | Kindig |
| D577,412 S | 9/2008 | Nathan et al. |
| 7,458,182 B2 | 12/2008 | Johnson |
| D589,583 S | 3/2009 | Phillips et al. |
| D589,584 S | 3/2009 | Phillips et al. |
| D590,908 S | 4/2009 | Walsh |
| 7,530,195 B2 | 5/2009 | Müller et al. |
| 7,607,254 B1 | 10/2009 | Huang |
| 7,627,981 B1 | 12/2009 | Doster et al. |
| D611,559 S | 3/2010 | Crider et al. |
| 7,669,363 B2 | 3/2010 | Frisch |
| 2002/0035801 A1 | 3/2002 | Ogura |
| 2002/0046483 A1 | 4/2002 | Snell et al. |
| 2002/0066222 A1 | 6/2002 | Gehret et al. |
| 2002/0184812 A1 | 12/2002 | Gehret et al. |
| 2002/0184813 A1 | 12/2002 | Johnson et al. |
| 2003/0029076 A1 | 2/2003 | Snell et al. |
| 2003/0041504 A1 | 3/2003 | Knuppel et al. |
| 2003/0110679 A1 | 6/2003 | Collins |
| 2003/0131522 A1 | 7/2003 | Swift et al. |
| 2003/0140549 A1 | 7/2003 | Gehret et al. |
| 2003/0150152 A1 | 8/2003 | Gehret et al. |
| 2003/0182846 A1 | 10/2003 | Nelson et al. |
| 2003/0208949 A1 | 11/2003 | Nelson et al. |
| 2004/0020100 A1 | 2/2004 | O'Brien et al. |
| 2004/0025410 A1 | 2/2004 | Shapland |
| 2004/0079025 A1 | 4/2004 | Snell et al. |
| 2004/0216365 A1 | 11/2004 | Hill |
| 2004/0216368 A1 | 11/2004 | Simpson et al. |
| 2005/0028428 A1 | 2/2005 | Wills |
| 2005/0081425 A1 | 4/2005 | Guidry |
| 2005/0102887 A1 | 5/2005 | Lang et al. |
| 2005/0178047 A1 | 8/2005 | Aguillera |
| 2005/0279015 A1 | 12/2005 | Hall |
| 2005/0284015 A1 | 12/2005 | Greisman |
| 2006/0026893 A1 | 2/2006 | Sears |
| 2006/0053682 A1 | 3/2006 | Goldstein |
| 2006/0123693 A1 | 6/2006 | Muller et al. |
| 2006/0156615 A1 | 7/2006 | Hale |
| 2006/0156617 A1 | 7/2006 | Hale |
| 2007/0193108 A1 | 8/2007 | Gordon et al. |
| 2007/0289200 A1 | 12/2007 | Danielsson |
| 2008/0072475 A1 | 3/2008 | Nelson et al. |
| 2008/0078115 A1 | 4/2008 | Kness et al. |
| 2008/0120895 A1 | 5/2008 | Schwartz et al. |
| 2008/0120896 A1 | 5/2008 | Johnson |
| 2008/0172926 A1 | 7/2008 | Wright |
| 2008/0216386 A1 | 9/2008 | Le Laidier et al. |
| 2008/0256842 A1 | 10/2008 | Vasseghi |
| 2009/0145018 A1 | 6/2009 | Reitenbaugh, Sr. |
| 2009/0151222 A1 | 6/2009 | Bruno et al. |
| 2009/0151223 A1 | 6/2009 | Nathan et al. |
| 2009/0151224 A1 | 6/2009 | Nathan et al. |
| 2009/0151225 A1 | 6/2009 | Everett et al. |
| 2009/0229169 A1 | 9/2009 | Weisberg et al. |
| 2009/0282727 A1 | 11/2009 | Bell |
| 2009/0313879 A1 | 12/2009 | Vasyl |
| 2009/0313880 A1 | 12/2009 | Bucher et al. |
| 2010/0018105 A1 | 1/2010 | Gauker et al. |
| 2010/0050498 A1 | 3/2010 | Nelson et al. |

FOREIGN PATENT DOCUMENTS

| | | |
|---|---|---|
| JP | 2001037399 A | 2/2001 |
| JP | 2010098977 A | 5/2010 |
| WO | 9963812 A1 | 12/1999 |
| WO | 2004098281 A1 | 11/2004 |
| WO | 2009047611 A1 | 4/2009 |
| WO | 2010022779 A1 | 3/2010 |
| WO | 2010028378 A2 | 3/2010 |
| WO | 2010033908 A1 | 3/2010 |
| WO | 2010033917 A2 | 3/2010 |

US 8,839,550 B2

RODENT STATION

TECHNICAL FIELD

The disclosure relates to pest elimination, and in particular to rodent traps.

BACKGROUND

Rats, mice and other rodents are a cause of concern for businesses and homeowners alike. Rodents are an indication of unsanitary conditions, and their history of spreading disease may frighten customers. Because they often live and travel in garbage, sewers and other unsanitary areas, rodents can spread bacteria and disease such as *Salmonella, E. coli* and dysentery. A single rodent sighting can drive a customer away for good or result in inspection evaluations that negatively impact a business. Rodents may also destroy valuable food inventory, and their gnawing and burrowing may cause costly structural damage.

Many homes and businesses deploy a variety of traps, such as mechanical or bait-based traps, throughout a business' physical premises and facilities to achieve a reduction and/or elimination of rodents. These actions can be undertaken to insure inspection compliance, to maintain sanitary conditions, reduce spoilage, comply with applicable laws and regulations, and/or increase consumer confidence.

Physical inspections of each and every trap at a facility may be performed at desired time intervals (e.g., daily, weekly or monthly). During these inspections, a technician may insure that captured rodents are removed from the trap, that the trap is in working order, and that the trap is still in the proper location. Records of trap maintenance may be kept on labels affixed to the interiors or exteriors of the trap. The labels are difficult to write on, and may fall off or become unreadable due to weathering. Moreover, if labels are accessible to rodents, the rodents may chew on, defecate on or otherwise soil the labels, raising sanitary, and disease concerns for maintenance personnel, as well as possibly making the labels unreadable.

SUMMARY

In general the disclosure is directed to a rodent station for capturing or trapping mice, rats or other rodents. The rodent station may be sized such that one or more rodent traps, such as conventional snap traps, ramp traps, glue boards, etc., may be placed within the rodent station. The rodent station may provide one or multiple rodent entry points. The rodent station may present a high contrast entrance that is relatively darker than the station enclosure. The station opening size may be adjustable to accommodate both mice and rats.

In one example, a rodent station comprises an elongate enclosure body having an interior sized to receive at least one rodent suppression device, the enclosure body having a first end and a second end, the first end including a first opening, an end cap sized to fit over the second end of the enclosure body, the end cap having second opening, and at least one door insert, sized to fit within at least one of the first opening or the second opening, the at least one door insert including a rodent entry point that is relatively smaller than the first or the second opening.

In another example, a rodent station comprises an elongate enclosure body having an interior sized to receive at least one rodent suppression device, the enclosure body having a first end and a second end, the first end including a first opening, an end cap sized to fit over the second end of the enclosure body, the end cap having second opening, a first door insert, sized to fit within the first opening, the first door insert including a rodent entry point that is relatively smaller than the first opening, a second door insert, sized to fit within the second opening, the second door insert including a rodent entry point that is relatively smaller than the second opening, and a rodent snap trap positioned within the interior of the enclosure body.

In another example, a rodent station comprises an elongate enclosure body having an interior sized to receive at least one rodent suppression device, the enclosure body having a first end and a second end, the first end including a first opening, an end cap sized to fit over the second end of the enclosure body, the end cap having second opening, a first door insert, sized to fit within the first opening, the first door insert including a rodent entry point that is relatively smaller than the first, a second door insert, sized to fit within the second opening, the second door insert including a face plate that prevents passage of a rodent, and one or more rodent suppression devices, designed to enclose, retain, or kill rodents or other small mammalian pests sized to fit within the enclosure body.

The details of one or more examples are set forth in the accompanying drawings and the description below. Other features and advantages will be apparent from the description and drawings, and from the claims.

DETAILED DESCRIPTION

In general the disclosure is directed to a rodent station that captures and/or traps mice, rats, or other rodents. Although described herein generally for use with rodents, the rodent station may also be used to trap other small mammals. The rodent station may permit entry of rodents from one or more openings. The size of the opening(s) may be adjustable to accommodate either mice, rats, or both. One or more rodent suppression devices, designed to enclose, retain, or kill rodents or other small mammalian pests, may be placed within the rodent station. The one or more rodent suppression devices may include, for example, conventional snap traps, ramp traps, glue boards, or any other lethal or non-lethal rodent traps. The rodent station may present a high contrast entrance that is relatively darker than the station enclosure that may attract mice exhibiting startle behavior. A receptacle for maintenance records or other printed material may also be included.

Figure 1A:
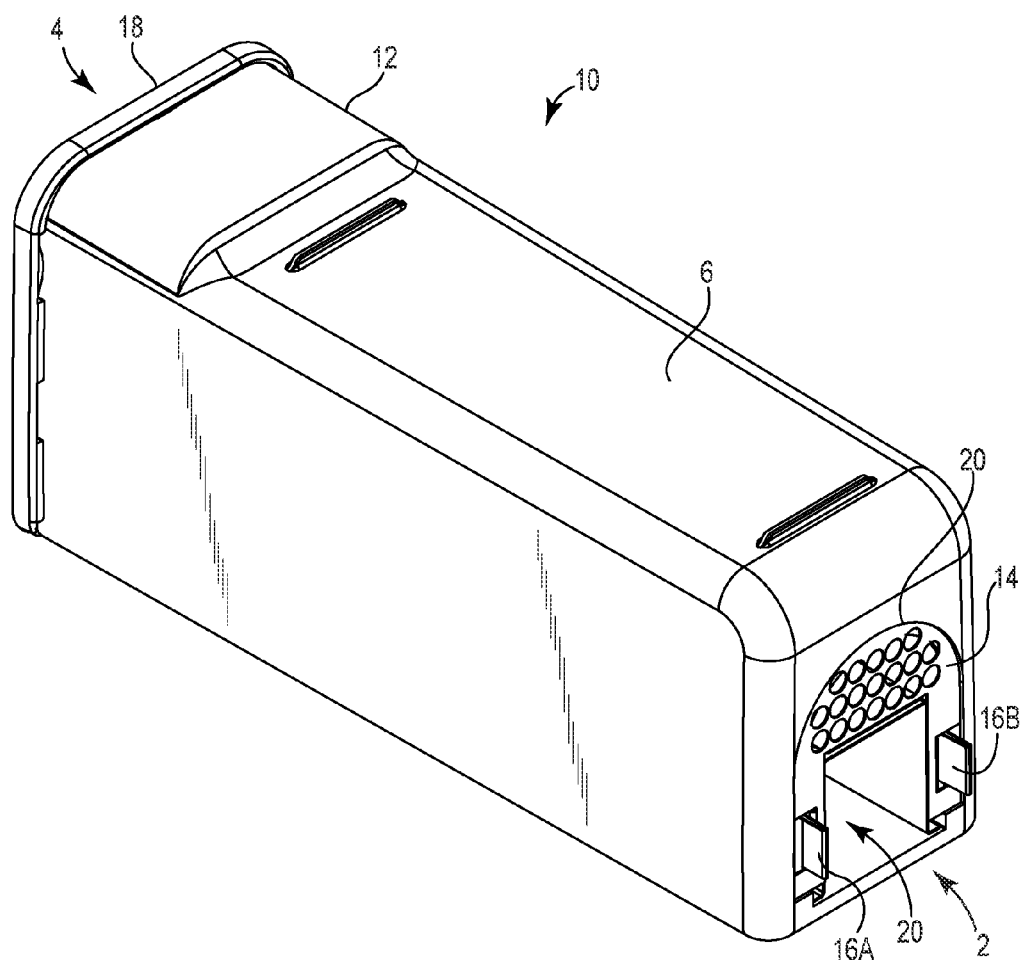
FIG. 1A is a perspective view of an example rodent station viewed from a first end and FIG. 1B is a perspective view of the example rodent station viewed from a second end.
Figure 1B:
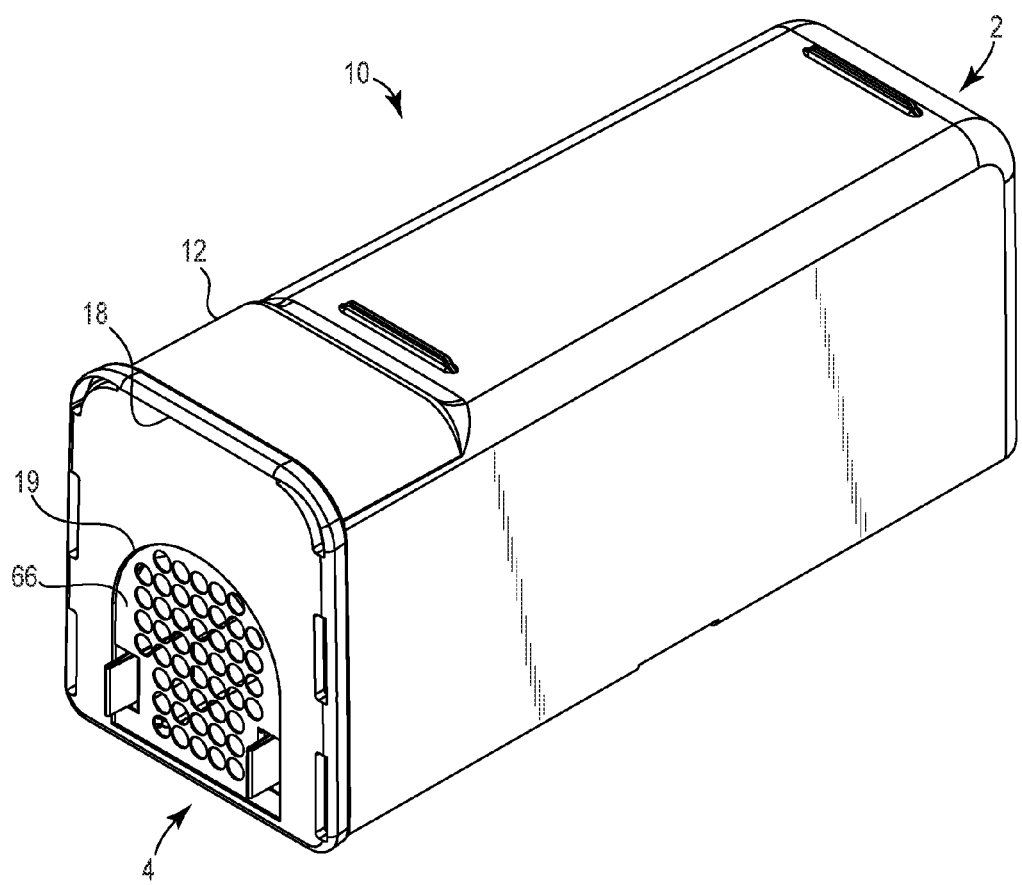

FIG. 1A is a perspective view of the exterior of an example rodent station 10 viewed from a first end 2. FIG. 1B is a perspective view of the exterior of an example rodent station 10 viewed from a second end 4. Example rodent station 10 includes a housing 12 formed by a generally elongate enclosure body 6 and at least one end cap 18. Enclosure body 6 may be generally shaped to be positioned proximate a building wall (with the elongated portion facing the wall). Although in this example enclosure body 6 has a generally rectangular width-wise cross-section, it shall be understood that enclosure body could also be constructed having a generally square, arched or other shaped width-wise rectangular cross-section, and that the disclosure is not limited in this respect.

In some examples, enclosure body 6 may be fabricated as an integral injection molded plastic member, such as polypropylene or other suitable injection molded material. For some applications, such as food service, enclosure body may be fabricated from an impact and shatter resistant material. End cap 18 may be constructed of similar material. However, enclosure 12 and end cap 18 may also be made of other materials such as metal, galvanized metal, stainless steel, painted metal, nylon, etc., and the disclosure is not limited in this respect.

End cap 18 may be constructed with a snap-in-place, slide in place, or other removable mechanism that allows access to interior portion of rodent station 10. For example, end cap 18 may be removed for maintenance, cleaning, or for placement of one or more rodent suppression devices such as a snap trap, ramp (i.e., teeter totter) trap, glue board or other appropriate rodent suppression device.

In this example the first end 2 of enclosure body 6 may include a generally arch-shaped opening 20. Similarly, as shown in FIG. 1B, end cap 18 may include a generally arch-shaped opening 19. It shall be understood that an arch-shape is but one example of opening shapes that may be used, and that the openings 19 and/or 20 may take on other alternative shapes, and that the disclosure is not limited in this respect. One or more removable door inserts, such as door inserts 14 and 66, are sized to fit within openings 19 and 20. Door insert 14 includes an opening 11 that is relatively smaller than opening 20. Door insert 66 is a blocking door insert that prevents entry or exit of rodents into or out of rodent station 10. In this example, openings 19 and 20 and the one or more removable door inserts 14, 66 allow the number and/or size of the rodent entry point(s) into rodent station 10 to be adjusted. For example, when door insert 14 is positioned within opening 19 and/or 20, the relatively smaller sized opening 11 into rodent station 10 permits entry of smaller sized rodents, such as mice, while preventing larger rodents, such as rats, from entering. When the door inserts 14 and/or 66 is removed, corresponding openings 20 and 19 are large enough to permit entry of both smaller and larger sized rodents.

In this example, door inserts 14, 66 may include one or more tabs 16A and/or 16B by which door inserts 14, 66 may be inserted into and/or removed from enclosure 12. However, it shall be understood that other mechanisms for inserting door inserts 14, 66 into rodent station 10 may also be used and that the disclosure is not limited in this respect.

Certain rodents, such as mice, exhibit startle behavior when they first enter a facility. Once they enter a building through a door or other opening, rodents tend to move along the walls as they seek a hiding place. With this in mind, rodent station 10 may include a high contrast door opening designed to attract mice exhibiting such startle behavior when they first enter a facility. For example, door insert 14 may be fabricated so that it is relatively darker than the color of enclosure 12. This may help to give the door insert 14 and consequently rodent station 10 the appearance of a hole or hiding place. To that end, door insert 14 may be fabricated from a relatively darker material than enclosure 12, or painted so that it is relatively darker than the color of enclosure 12.

Figure 2A:
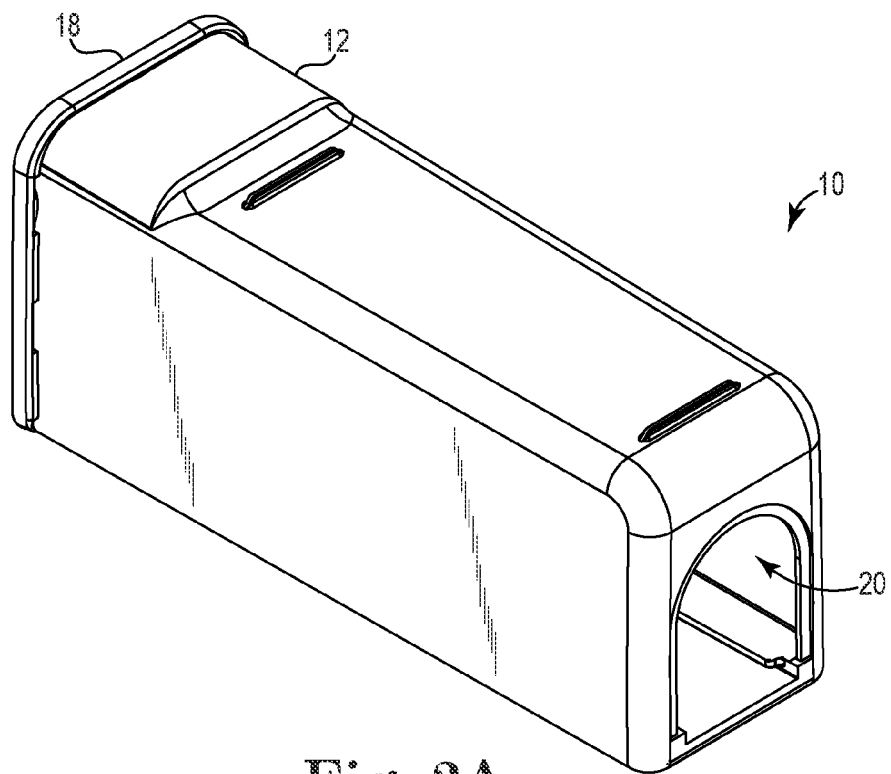
FIG. 2A is a perspective view of an example rodent station with the door insert removed.
Figure 2B:
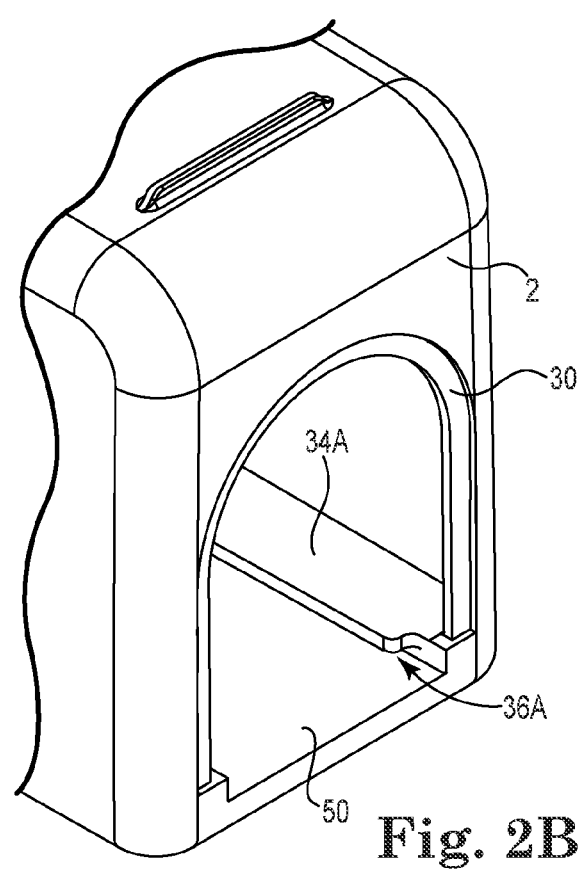
FIG. 2B is an enlarged perspective view of the first end of rodent station with door insert removed.

FIG. 2A is a perspective view of the exterior of an example rodent station 10 with no door insert in opening 20. FIG. 2B is an enlarged perspective view of first end 2 of rodent station 10 with no door insert in opening 20, through which a portion of the interior of rodent station 10 may be seen. In this example, a door receiving recess 30 is generally shaped to receive a door insert, such as door insert 14, 66, so that when the door insert is fitted into place within opening 20, the exterior side of the door insert is flush with the exterior side of first end 2. The interior side walls of enclosure 12 may further include length-wise extending extensions forming a first shelf 34A (shown in FIG. 2B) and a second shelf 34B (not seen in FIG. 2B). First shelf 34A and second shelf 34B, together with floor 50, form channels 36A and 36B, respectively. Channels 36A and 36B (channel 36B not seen in FIG. 2B) are sized to receive externally directed flaps 72A and 72B, respectively, of a conventional ramp-type rodent trap, such as that shown in FIG. 4. Shelf 34A and shelf 34B and also channels 36A and 36B may extend from first end 2 to second end 4 so that ramp traps may be inserted at either first end 2 and/or second end 4 of rodent station 10.

Figure 3A:
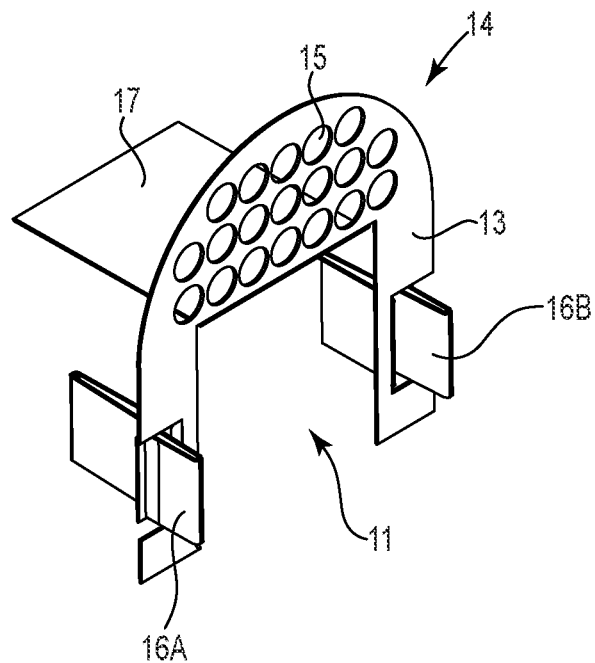
FIGS. 3A-3C are perspective views of example door inserts.

FIG. 3A is a perspective view of a first example door insert 14. Door insert 14 includes a face plate 13 including an opening 11. In this example, opening 11 is relatively smaller than openings 19, 20 in enclosure body 6, and is sized to permit entry of smaller rodents such as mice. Example door insert 14 includes engagement members 16A and 16B. In this example, door engagement members 16A and 16B are deformable and may be pressed inwardly. Door insert 14 may be placed into rodent station 10 by pressing one or both of engagement members 16A and 16B inwardly, positioning door insert 14 within the door receiving recess, and releasing engagement members 16A and 16B so that outwardly extending tabs 15A and 15B extend behind associated edges of door receiving recess 30. Similarly, to remove door insert 14, one or both of engagement members 16A and 16B may be pressed inwardly so that tabs 15A and 15B also move inwardly, thus permitting door insert 14 to be removed from rodent station 10.

Door insert 14 may also include one or more visibility holes 15. Visibility holes 15 permit a user to easily view whether a rodent has been captured within rodent station 10. Door insert 14 may also include a trap cover 17 extending rearwardly from faceplate 13 above opening 11. In this example, trap cover 17 blocks rodent exit via a slotted opening on the top of some conventional ramp traps, such as ramp trap 70 shown in FIG. 4. However, it shall be understood that door insert 14 need not include a trap cover, and that the disclosure is not limited in this respect.

Figure 3B:
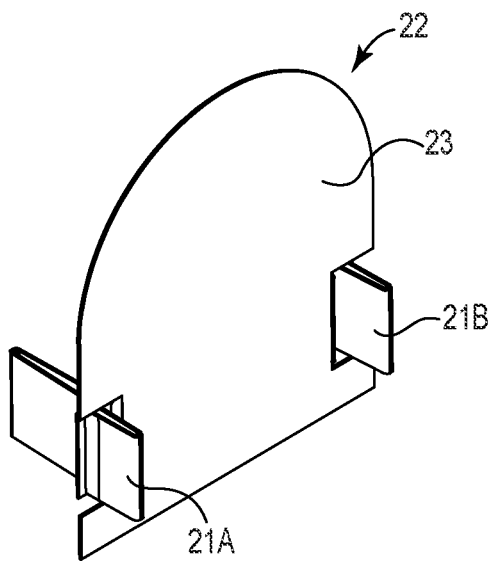

FIG. 3B is a perspective view of another example door insert 13. Example door insert 13 is a blocking door insert that includes a solid face plate 23. Door insert 13 is sized to fit within an opening 19 and/or 20 and may thus be used to completely block one of the openings 19 and/or 20, thus preventing a rodent from entering rodent station 10 via that opening. Although example door insert 13 is shown with a solid face plate 23, it shall be understood that any face plate designed to prevent rodent passage may be used. For example, face plate 23 could be constructed in a manner such as door insert 66 shown in FIG. 1B, in which the faceplate includes a plurality of holes, each of the holes small enough to prevent passage by a rodent. Other example blocking door inserts could be constructed of a screen-type material, bars, a perforated material, or any other material that would prevent passage of a rodent. Although not shown in this example, door insert 13 may also include one or more visibility holes of the type shown in FIG. 3A. In this example, door insert 13 includes door engagement tabs 21A and 21B that may be similar to door engagement mechanisms 16A and 16B as described above and via which door insert 13 may be positioned within either one of the openings 19 or 20.

Rodent station 10 may be configured as either a uni-directional rodent station or a bi-directional rodent station. That is, rodent station 10 may be configured to include a single rodent entry point (uni-directional) or two rodent entry points (bi-directional). For example, if rodent station 10 is to be bi-directional, rodent station 10 may be configured by leaving openings 19 and 20 without door inserts, thus providing two relatively larger sized entry points into rodent station 10. As another example of a bi-directional configuration, both openings 19 and 20 could be fitted with a door insert such as door insert 14 to provide two relatively smaller sized entry points into rodent station 10. As yet another example of a bi-directional configuration, one opening 19 or 20 could be fitted with a removable door insert 14 and the other opening 19 or 20 could be left without a door insert, thus providing two rodent entry points into rodent station 10, one relatively larger entry point and one relatively smaller entry point. Alternatively, if rodent station 10 is to be configured as a uni-directional rodent station, one of openings 19 or 20 may be fitted with a blocking door insert such as blocking door insert 22, 66, while the other opening is either left without a door insert or is fitted with a door insert such as door insert 14.

Figure 3C:
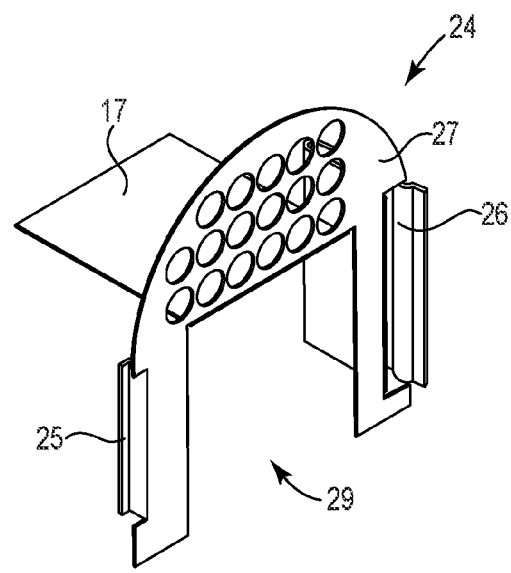
Figure 3D:
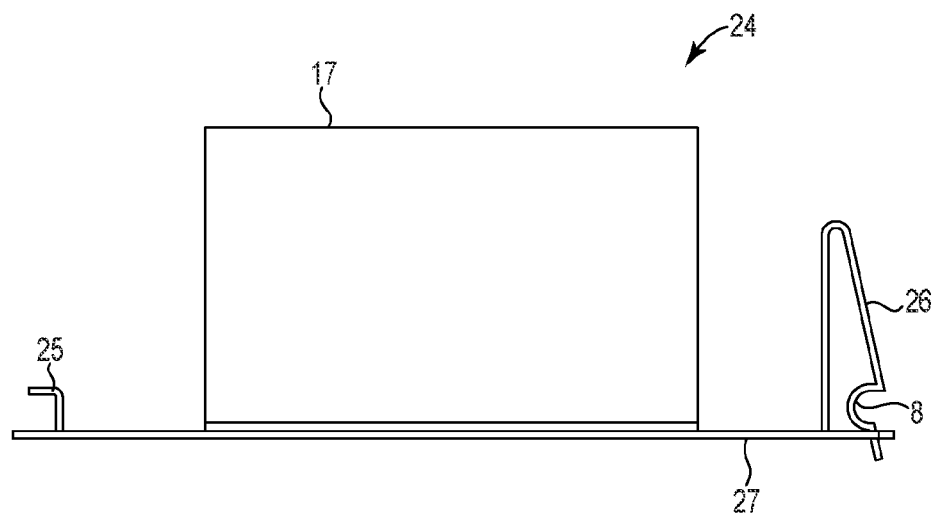
FIG. 3D is a bottom view of the example door insert of FIG. 3C.

FIGS. 3C and 3D are a front view and a bottom side view, respectively, of another example door insert 24. In this example, door insert 24 includes a hook 25 and a catch 26. Catch 26 includes a space 8 for receipt of an edge of the door receiving recess 30. In use, door insert 24 is positioned within opening 19, 20 such that hook 25 extends behind one edge of door receiving recess 30 and opening 23 of catch 26 receives another edge of the door receiving recess 30. Although in this example door insert 24 is shown as including one hook 25 and one catch 26, it shall be understood that door insert 24 may include one or more hooks and/or one or more catches, and the disclosure is not limited in this respect. In addition, many other mechanisms for engaging a door insert within an opening of the rodent station housing may also be used, and are also contemplated as within the scope of the present disclosure. These hook and catch variations may also be used with a blocking door insert such as blocking door inserts 22, 66.

Figure 4:
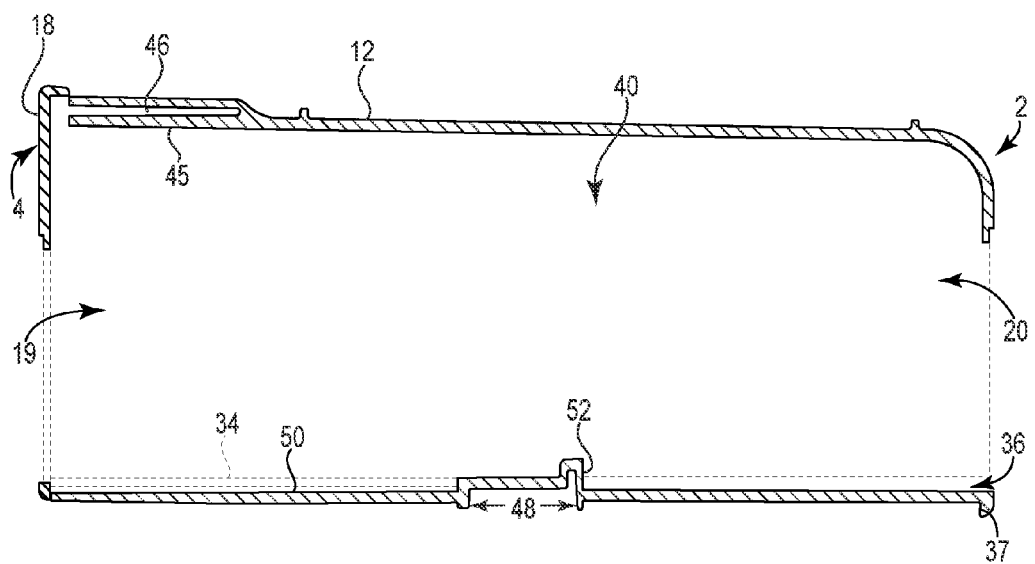
FIG. 4 is a cross-sectional side view of the example rodent station of FIG. 1 (doors removed).

FIG. 4 is a cross-sectional side view of the example rodent station 10 of FIG. 1. In FIG. 4, there are no door inserts positioned within openings 19 or 20. Rodent station 10 includes an interior cavity 40 defined by the interior walls of enclosure 12. In general the interior walls of enclosure 12 may be fabricated such that discontinuities in the rodent-accessible surfaces of interior 40 are minimized. This may help reduce damage from rodent activities such as gnawing, chewing, or scratching and/or increase clean-ability. However, it should be appreciated that any surface profiles may be used and that the disclosure is not limited in this respect.

Shown via phantom line in FIG. 4 is one of the length-wise extending extensions forming shelf 34 as described above with respect to FIG. 2B. As described above, channel 36 is defined by the lower side of shelf 34 and the floor 50. In this example, enclosure 12 of rodent station 10 includes an inclined floor that may help to direct any water that may accumulate in rodent station 10 out of the enclosure 12. In this example, a raised footing 37 may be provided at the base of first end 2. Raised footing 37 elevates first end 2 with respect to second end 4 such that floor 50 is relatively higher at first end 2 and inclines downwardly toward second end 4. However, it shall be understood that inclined floor may be ramped in the opposite direction, or may be ramped from the center towards both ends, and that the disclosure is not limited in this respect. In addition, other mechanisms for providing an inclined floor may also be used, and the disclosure is not limited in this respect.

Rodent station 10 may also include a receptacle 46 located in the interior of enclosure 12 for storing and protecting printed materials. As shown in this example, receptacle 46 may be defined by an interior shelf 45 and the ceiling of enclosure 12. Receptacle 46 may be useful for storing maintenance records or other printed materials which may be removed, written upon, and returned during maintenance of station 10. Other materials, such as instruction manuals, warnings, etc. may also be stored in receptacle 46 as desired. As shown this example, receptacle 46 may be isolated (e.g., by end cap 18 and the shelf 45) from any rodent accessible areas within enclosure 12 to prevent rodents from gnawing on any printed materials stored therein and/or to prevent moisture from entering receptacle 46. In other examples, receptacle 46 may be accessed by a separate access door or other closure that restricts access by rodents.

Rodent station 10 is flexible in the sense that it may be configured in any number of ways. Multiple combinations of the enclosure 12, door inserts, and/or conventional rodent suppression devices may be used to configure rodent station 10 to fit a variety of rodent-trapping situations.

Figure 5:
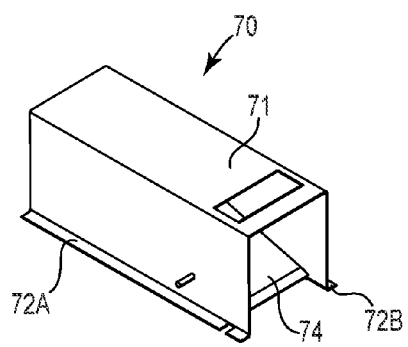
FIG. 5 is a perspective view of a conventional ramp or teeter-totter type rodent trap.
Figure 7:
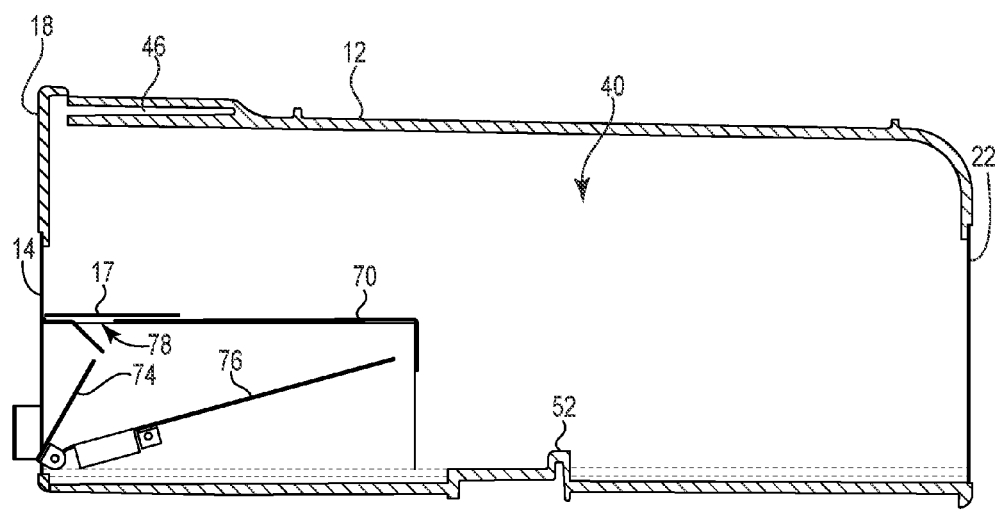
FIG. 7 is a cross-sectional side view of the example rodent station of FIG. 1 having a ramp trap positioned therein.

For example, rodent station 10 may be combined with a conventional ramp or teeter-totter type rodent trap. FIG. 5 is a perspective view of a conventional ramp or teeter-totter type rodent trap. FIG. 7 is a cross-sectional side view of the example rodent station 10 of FIG. 1 having a ramp trap 70 positioned therein. This configuration may be used in a non-lethal trap application, where trapping but not killing of rodents is desired. Conventional ramp-type trap 70 includes a passage-shaped housing 71 in which a weighted ramp 76 and a door 74 are positioned. Housing 71 may further include externally directed flaps 72A and 72B extending along a bottom edge of each length-wise side of the housing 71. In use, a mouse or other rodent crawls up the ramp 76 causing the ramp to tip, levering door 74 into place to cut off escape. Since the rodent cannot go back it continues into the trap until it steps off the ramp, at which point gravity resets ramp 76 and door 74 back to their original position.

As mentioned above, door insert 14 may also include a trap cover 17. In this example, trap cover 17 blocks rodent exit via a slotted opening 78 located the top of conventional ramp traps, such as ramp trap 70.

In one example, to position ramp trap 70 within rodent station 10, externally directed flaps 72A and 72B may be slid within channels 36A and 36B, respectively (see also FIG. 2B) until trap 70 is completely within the housing 12. End cap 18 may then be locked into place on second end 4, and door insert 14 positioned within the opening 19 in end cap 18. A blocking door insert 22, 66 may also be positioned within opening 20 at first end 2 of rodent station 10.

In the event that a ramp trap or other rodent suppression device is not to be inserted into channels 36A and 36B, a removable floor insert (not shown) having similarly sized externally directed flaps could be slid into channels 36A and 36B. Such a floor insert may also include a raised center portion sized such that the top of the raised center portion of the floor insert was level with the shelves 34A and 34B when the floor insert is positioned within the grooves 36A and 36B.

Figure 6:
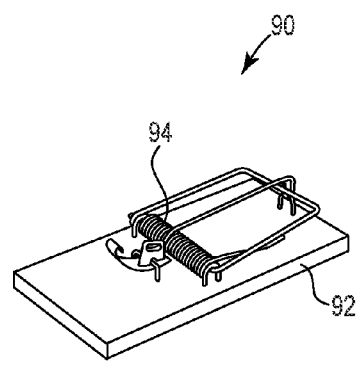
FIG. 6 is a perspective view of a conventional snap type rodent trap.
Figure 8:
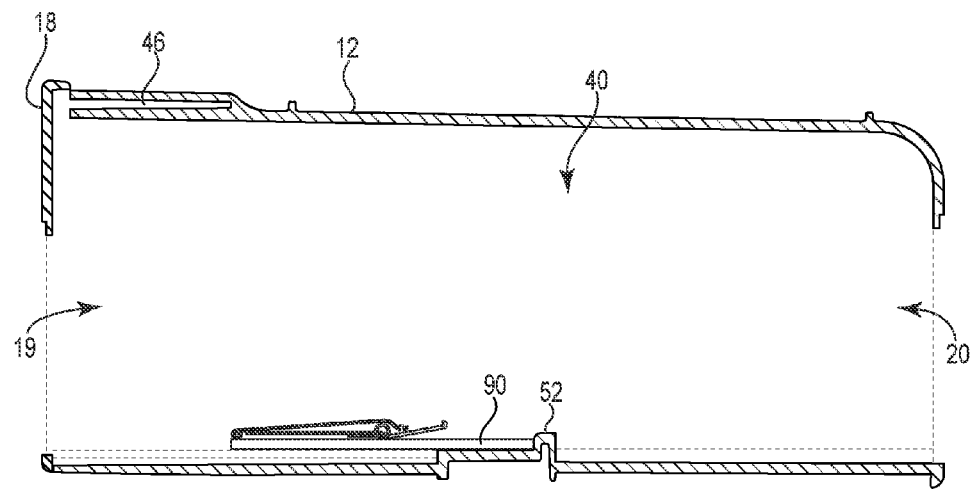
FIG. 8 is a cross-sectional side view of the example rodent station of FIG. 1 having a rat snap trap positioned therein.

As another example, rodent station 10 may be combined with a conventional snap-type rodent trap. FIG. 6 is a perspective view of a conventional snap-type rodent trap. This configuration may be used in a lethal trap application, where trapping and killing of rodents is desired. Conventional snap trap 90 includes a base 92 and a spring-loaded bar/trip mechanism 94. FIG. 8 is a cross-sectional side view of the example rodent station 10 of FIG. 1 having a conventional snap trap 90 positioned therein. Trap 90 may be placed at either first end 2 or second end 4 of rodent station 10. As another example, two traps 90 may be placed inside of rodent station 10. In the example shown in FIG. 8, rodent station 10 is bidirectional; that is, a rodent may enter rodent station 10 via either opening 19 or opening 20. In examples where trap 90 is a rat trap, neither of openings 19 or 20 contain a door insert. In examples where trap 90 is a mouse trap, either one or both of openings 19 or 20 may contain a door insert such as door insert 14. As another example, if rodent station were to be used unidirectionally, one of openings 19 or 20 may include a blocking door insert such as door insert 22.

A stop 52 formed in floor 50 may help to keep trap 90 in the proper position within rodent station 10 or to prevent trap 90 from excessive movement within rodent station 10.

Figure 9:
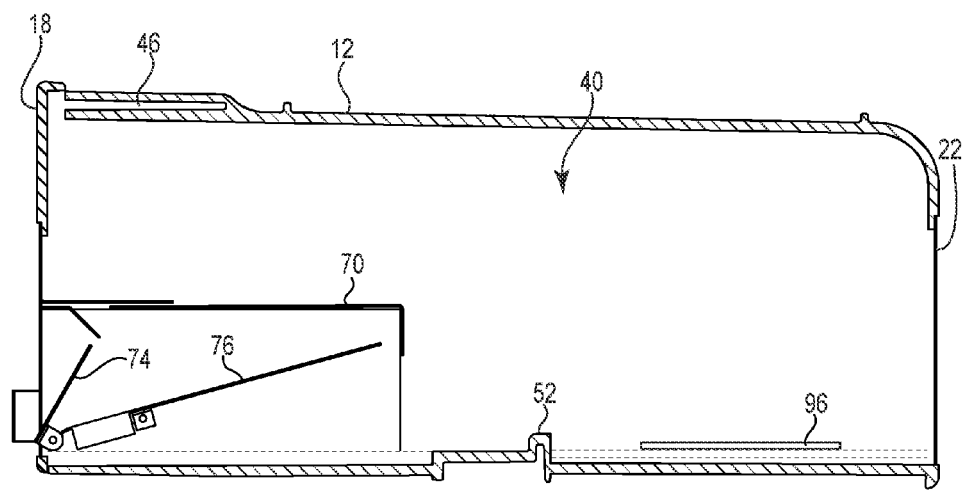
FIG. 9 is a cross-sectional side view of the example rodent station of FIG. 1 having a ramp trap and a glue board positioned therein.

As another example configuration, FIG. 9 is a cross-sectional side view of the example rodent station 10 of FIG. 1 having a conventional glue board 96 and a conventional ramp-type trap 70 positioned therein. In this example, trap 90 is a mouse trap. A door insert 14 may be positioned on the second end 4 (on the side containing the ramp trap) and a door insert 22 may be positioned on the first end 2 (on the side containing the glue board).

Although in this example a conventional glue board and a conventional ramp trap are shown, it shall be understood the rodent station described herein may be used with any type of rodent trap, including any type of lethal or non-lethal rodent trap, or any combination thereof.

Figure 10:
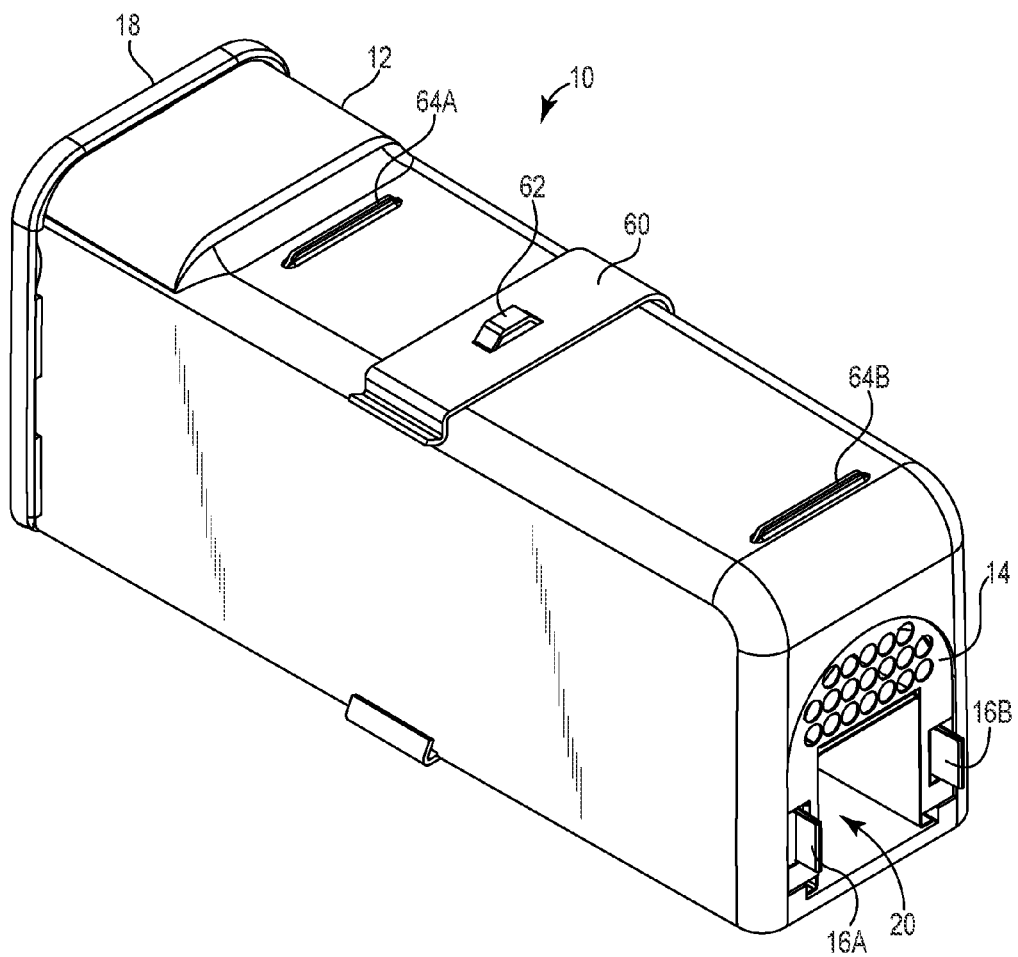
FIG. 10 is a perspective view of an example rodent station with an example mounting bracket.

In some examples, rodent station 10 may include tether and/or anchor capability. This may allow the station to be tethered/anchored to a wall, floor, or other object. FIG. 10 is a perspective view of an example rodent station 10 and an example mounting bracket 60. Bracket 60 may be generally sized to receive enclosure 12. Bracket 60 may include, for example, a tether aperture 62 via which bracket 60 and therefore rodent station 10 may be tethered to a strap, rope, chain or other tether mechanism and thus anchored to a wall, floor, or other object. Alternatively or in addition, bracket 60 may include screw anchor holes or other anchoring mechanism via which bracket 60 and thus rodent station 10 may be anchored to a wall, floor, or other object. In this example, bracket 60 is sized to fit within anchor receiving recess 48 of enclosure 12 (see, e.g., FIG. 4). Recess 48 may help to prevent anchor 60 from excessive sliding or falling off of rodent station 10. Enclosure 12 may also include raised anchor guides 64A and 64B which may also prevent anchor 60 from sliding off of rodent station 10.

Various examples of the invention have been described. These and other examples are within the scope of the following claims.

The invention claimed is:

1. A rodent station comprising:
an elongate enclosure body having an interior sized to receive at least one rodent suppression device, the enclosure body having a first end and a second end, the first end including a first opening through which a relatively larger sized rodent may enter the interior of the enclosure body;
an end cap sized to fit over the second end of the enclosure body, the end cap having a second opening through which a relatively larger sized rodent may enter the interior of the enclosure body;
a first door insert sized to removably fit within the first opening, the first door insert having a third opening that is relatively smaller than the first opening and through which a relatively smaller sized rodent may enter the interior of the enclosure body when the first door insert is fit within the first opening;
a second door insert sized to removably fit within the second opening, the second door insert having a fourth opening that is relatively smaller than the second opening and through which a relatively smaller sized rodent may enter the interior of the enclosure body when the second door insert is fit within the second opening; and
a third door insert sized to removably fit within at least one of the first opening or the second opening, the third door insert including a blocking face plate that prevents passage of rodents through the first or second opening into the interior of the enclosure body.

2. The rodent station of claim 1 wherein the first door insert and the second door insert are is relatively darker in color than the enclosure body.

3. The rodent station of claim 1 wherein the first opening and the second opening are substantially the same size.

4. The rodent station of claim 1 wherein the third door insert includes an engagement member deformable from an engaged position to an unengaged position.

5. The rodent station of claim 1 wherein the first door insert includes an engagement member deformable from an engaged position to an unengaged position.

6. The rodent station of claim 1 further comprising an interior receptacle disposed within the enclosure body, wherein the interior receptacle is accessible to a human user and the interior receptacle is isolated from a rodent accessible area of the enclosure.

7. The rodent station of claim 6 wherein the interior receptacle is accessible to the human user upon removal of the end cap from the enclosure body.

8. The rodent station of claim 6 wherein the interior receptacle is defined by at least one interior wall of the enclosure.

9. The rodent station of claim 6 wherein the interior receptacle stores a maintenance record for the rodent station.

10. The rodent station of claim 1 wherein the rodent suppression device includes at least one of a lethal rodent trap or a non-lethal rodent trap.

11. The rodent station of claim 1 wherein the rodent suppression device includes at least one of a conventional rodent snap trap, a conventional ramp trap, or a glue board.

* * * * *